C. H. BISSELL AND E. G. SMITH.
ELECTRIC CONDUIT FITTING.
APPLICATION FILED JULY 11, 1917.

1,311,376.  Patented July 29, 1919.

INVENTORS
Carl H. Bissell
Elda G. Smith
BY
ATTORNEYS

UNITED STATES PATENT OFFICE.

CARL H. BISSELL AND ELDA G. SMITH, OF SYRACUSE, NEW YORK, ASSIGNORS TO CROUSE-HINDS COMPANY, OF SYRACUSE, NEW YORK, A CORPORATION OF NEW YORK.

ELECTRIC-CONDUIT FITTING.

1,311,376.   Specification of Letters Patent.   Patented July 29, 1919.

Application filed July 11, 1917. Serial No. 179,992.

*To all whom it may concern:*

Be it known that we, CARL H. BISSELL and ELDA G. SMITH, citizens of the United States, and residents of Syracuse, in the county of Onondaga and State of New York, have invented a certain new and useful Electric-Conduit Fitting, of which the following is a specification.

This invention has for its object the production of an electric conduit fitting which is particularly simple and compact in construction and highly efficient and durable in use; and the invention consists in the novel features and in the combinations and constructions hereinafter set forth and claimed.

In describing this invention, reference is had to the accompanying drawings in which like characters designate corresponding parts in all the views.

Figure 1:
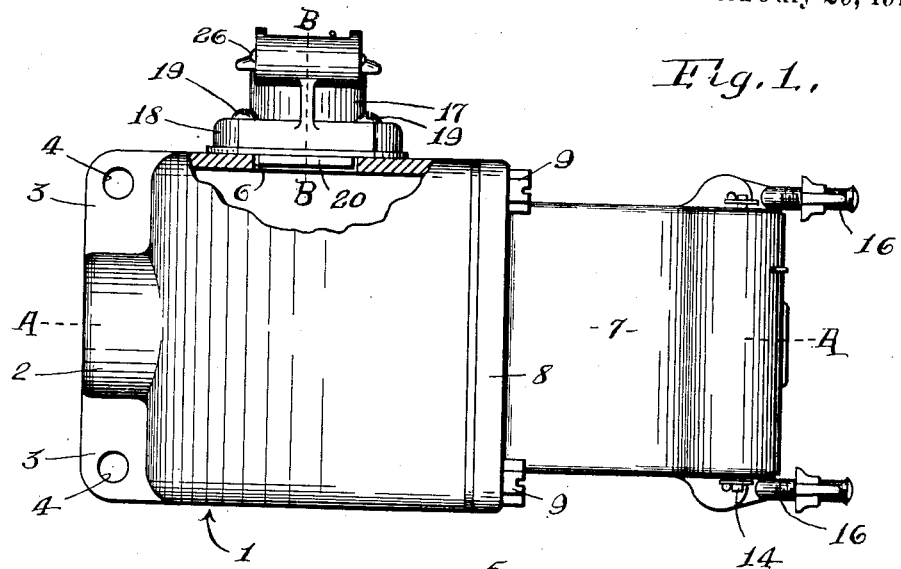
Figure 1 is a plan view, partly broken away, of one form of our conduit fitting.
Figure 2:
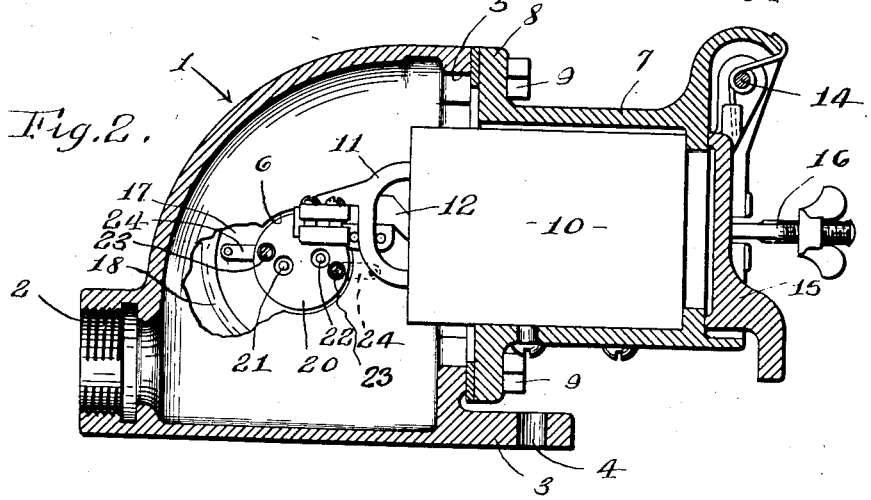
Fig. 2 is a sectional view on line A—A, Fig. 1.
Figure 3:
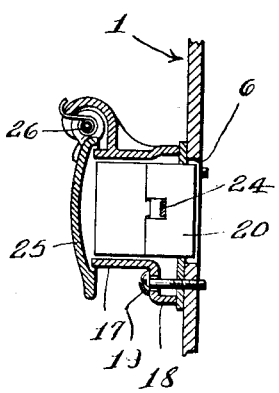
Fig. 3 is a fragmentary sectional view taken on the plane of line B—B, Fig. 1.

1 designates the body of a conduit outlet box, which is provided with means as a nipple 2 for connection to an electrical conduit inclosing the service wires, the box having a base flange 3 for connection to a suitable support to which it may be secured by fastening members, as screws or bolts passing through holes 4 in the base flange and into the support. The box is also here shown as provided with a rounding wall constituting the back and top wall thereof, and with openings 5, 6 in side walls thereof. The opening 5 is of nearly the same extent as the wall in which it is formed and is opposed to the rounding back and top of the box.

7 designates a casing detachably mounted on the box in alinement with the opening 5, it being here shown as having a base flange 8 which is secured to the edge of the body of the box around the opening 5 in any suitable manner as by cap screws 9 extending through the base flange and into suitable threaded holes in the body 1 of the box.

10 is an electrical device by means of which an electrical appliance can be electrically connected to the wires in the box, the device here shown consisting of a plug receptacle exposed to the interior of the box through the opening 5 and including a body of insulation and terminals 11, 12 carried by the body of insulation and extending through the opening 5 and into the interior of the body 1 where they are connected to wires leading into the body through the conduit connected to the nipple 2. The construction of the electrical receptacle *per se* forms no part of this invention, and it is thought that further description thereof is unnecessary.

The casing 7 is provided at its outer end with a suitable spring pressed lid 15 hinged at 14 thereto, and also with pivoted screws 16 by means of which the plug movable into the receptacle 10, is secured in position.

17 is an additional casing mounted on the side of the box in alinement with the opening 6 and having a base 18 which is secured to the side of the box in any suitable manner as by screws 19.

20 is the receptacle located in the casing 17 and having its rear end exposed to the interior of the box 1 through the opening 6, the receptacle 20 having its terminals 21, 22 exposed in the interior of the box 1 for connection to wires in said box.

The receptacle 20 is also secured in position to the casing 17 by means of fastening members as screws 23 extending through bars 24 extending laterally from the receptacle 20 within the base 18. The casing 17 is provided with a suitable spring pressed lid or cover 25 which is hinged thereto at 26.

This fitting is especially applicable for use at charging stations or railroads where the storage batteries of railway cars are recharged, and in operation, the fittings are mounted in suitable locations along the car tracks and connection is made with a storage battery of the car for charging the same by means of a plug movable into the receptacle 10 and connection is made with any other electrical appliance as a vacuum cleaner through the receptacle 20.

What we claim is:

In an electric conduit fitting, the combination of an outlet box including a body having means for connection to a conduit inclosing the service wires, a main outlet opening in one of the walls of the box, and an auxiliary opening in another wall thereof, a casing detachably mounted on the exterior of the box and alined with the main outlet opening, an auxiliary casing detachably mounted on the exterior of the box in alinement with the auxiliary opening, and main and auxiliary electrical receptacles carried in the casings respectively, and exposed to the interior of the box and having terminals for connection to the service wires therein, substantially as and for the purpose described.

In testimony whereof, we have hereunto signed our names at Syracuse, in the county of Onondaga, State of New York, this 21st day of June, 1917.

CARL H. BISSELL.
ELDA G. SMITH.